United States Patent [19]

Kundikoff

[11] 4,028,976
[45] June 14, 1977

[54] CUTTING TOOL GUIDANCE SYSTEM

[76] Inventor: Peter Kundikoff, Rte. 4, Box 870, Escondido, Calif. 92025

[22] Filed: June 5, 1975

[21] Appl. No.: 584,134

[52] U.S. Cl. .................................... 83/745; 33/96; 83/522

[51] Int. Cl.² .......................................... B27B 9/04

[58] Field of Search ............ 83/745, 744, 743, 522; 33/185 R, 96

[56] References Cited

UNITED STATES PATENTS

| 79,175 | 6/1868 | Winterbottom | 33/96 |
|---|---|---|---|
| 799,474 | 9/1905 | Larson et al. | 33/96 |
| 2,103,528 | 12/1937 | Hammond | 83/522 |
| 2,735,455 | 2/1956 | Forsberg | 83/745 |
| 2,773,523 | 12/1956 | Hopla | 83/745 |
| 2,942,633 | 6/1960 | King | 83/745 |
| 3,011,530 | 12/1961 | Lamb | 83/745 |
| 3,320,982 | 5/1967 | Kwiatkowski | 83/471.2 X |
| 3,739,678 | 6/1973 | Kankaanpaa | 83/745 |
| 3,864,830 | 2/1975 | Haddon | 83/745 |
| 3,869,951 | 3/1975 | Litwin | 83/745 |
| 3,913,440 | 10/1975 | Baker | 83/745 |

Primary Examiner—Travis S. McGehee
Attorney, Agent, or Firm—Brown & Martin

[57] ABSTRACT

A system for making an accurate linear cut on work stock characterized by utilizing an indicator that is notched to reflect the distance from a power tool cutting blade to the base plate follower edge. In customizing an indicator, a straightedge is fastened to a cutting board and the indicator is butt against the straightedge. The follower edge of the power tool guides the tool as it cuts through the cutting board until it notches the indicator on its edges. Nails fasten the indicator to the cutting board and are driven through recesses in the base of the indicator, to free it for use in conjunction with the stock to be cut. An adjustable indicator can be adapted for use with a variety of power tools and comprises a pair of parallel slide rails and at least one split bracket. The bottom section of the bracket is notched and the sections of the bracket are releasably connected by a fastener. The bracket is moved along the slide rails to the point corresponding to the distance between the cutting blade and the follower edge of the base plate. The position where the cut is to be made is indicated on the work stock by scribing a pair of marks adjacent the edges of the work stock. The indicator is set on the work stock and the marks are aligned with the notches formed in the indicator. Pegs fasten the indicator to the work stock and the straightedge or a ruler is butt against the indicators to establish the cutting position. Pegs are placed in the straightedge to maintain its position relative to the work stock, and the indicators are removed therefrom. The follower edge of the base plate is then butt against the straightedge and the work stock is cut in the normal manner.

15 Claims, 13 Drawing Figures

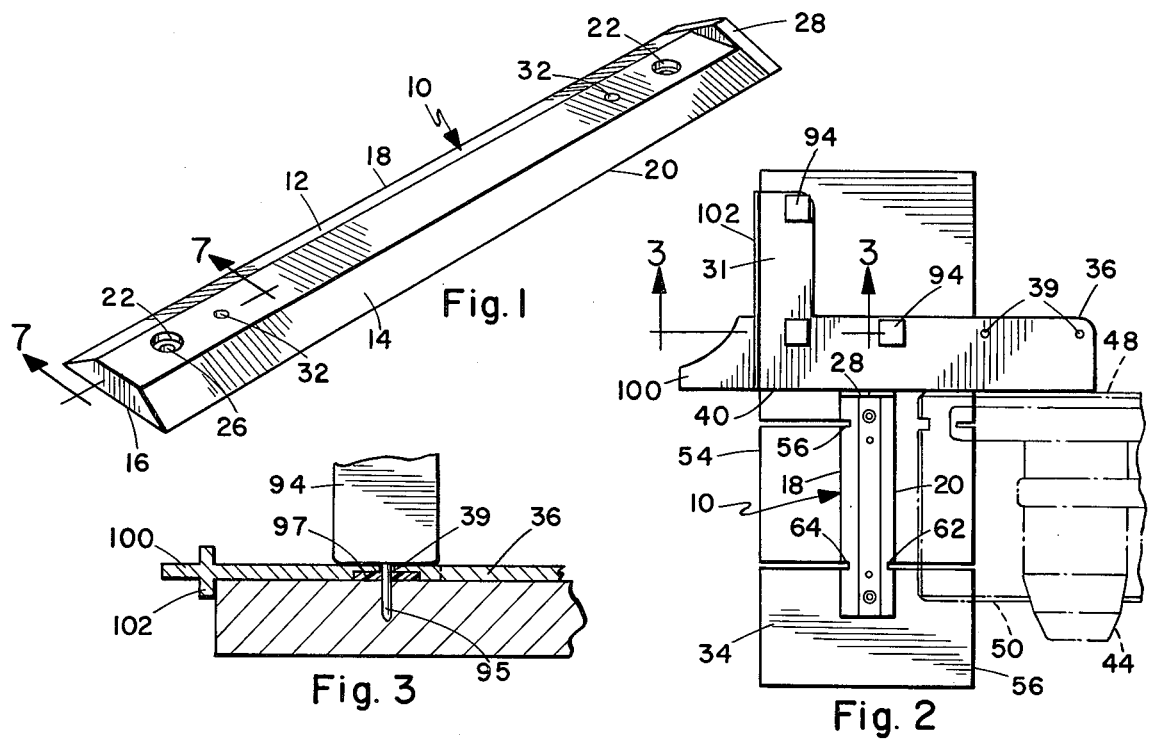
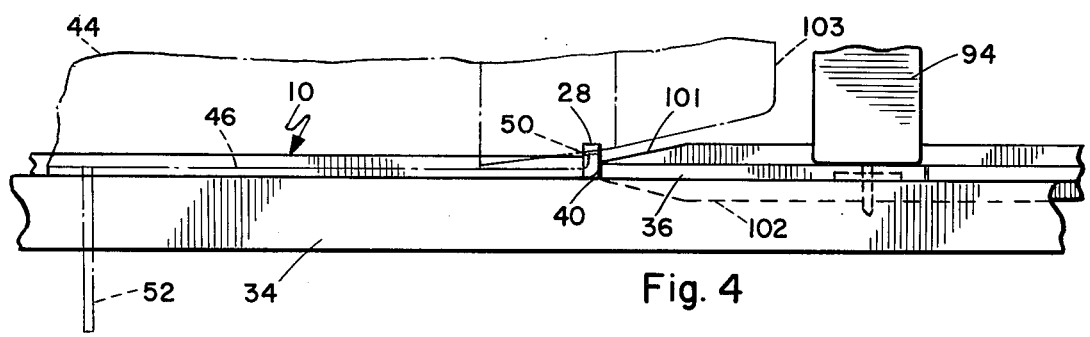
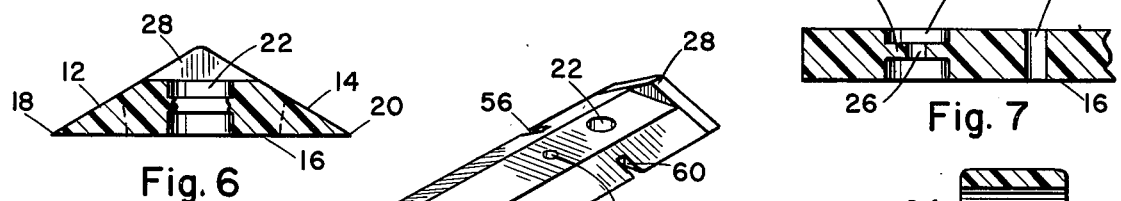
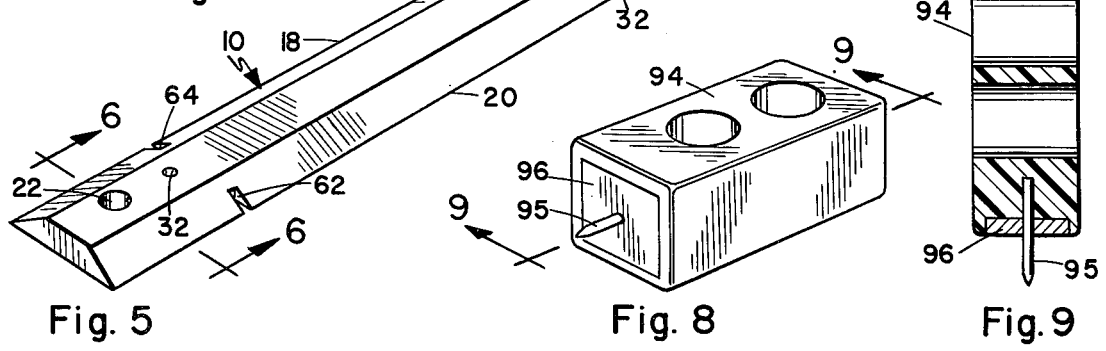

CUTTING TOOL GUIDANCE SYSTEM

BACKGROUND OF THE INVENTION

Despite the sophistication and versatility of modern power tools, even highly skilled craftsmen oftentimes find it difficult to cut a straight line across stock of any substantial width. In most methods, one of the first steps is the scribing of a line across the width of the board, the intent being to follow the path of the line as closely as possible. This method is characterized by several deficiencies. Firstly, when using a pencil or other device which marks the stock, there is a tendency of the line to get gradually thicker as the pencil is drawn across the board. In most instances, the craftsmen manually push the power tool, such as a circular saw, across the stock attempting to follow the path of the line. This is an inaccurate method; it is quite difficult for the operator to follow the line while he is pushing the saw. Also, the operator is sometimes faced with the problem of which side of the line on which to cut, particularly in those areas where the line has thickened. Furthermore, when attempting to split the line directly down the center, he is working with a line thickness of between 1/32 and 1.16 of an inch and even the exercise of ordinary judgment and care is often not sufficient to split the line.

Frequently, there are additional extraneous factors which interfere with the accuracy of the operator. One such factor is the necessity to drag an electrical cord of the power tool along the stock. These cords tend to be of substantial thickness and weight, and as the power tool is pushed or drawn along the stock, an increasingly greater weight of cord must be compensated for by the operator. This additional weight has a tendency to pull the power tool from the desired path.

The prior art has to some extent recognized the existing problems and attempts have been made to utilize the base plate or shoe of the power tool as a follower. The shoe often includes a straightedge parallel to the plane of the cutting blade. Some craftsmen frequently make use of this straightedge to guide the tool by sliding it against a straightedge guide member. This method is an incomplete solution to the problem. The offset between the follower edge and the cutting blade cannot be accurately measured so that a source of inaccuracy is always present.

Other attempts are characterized by complex, expensive and inconvenient to use apparatus. Furthermore, none of the prior art attempts compensate for differences in individual tools. Different units of the same model of a power tool may exhibit slightly varying differences in the distance between the cutting blade and the shoe follower edge. Therefore, there has been a need in the art to provide effective guidance for a power cutting tool, that is convenient to use and permits an efficient use of an operator's time.

SUMMARY OF THE INVENTION

It is an object of the invention to provide a new and improved power cutting tool guidance system.

Another object of the invention is to provide a new and improved power cutting tool guidance system that is adjustable for use with various cutting tools.

Another object of the invention is to provide a new and improved power cutting tool guidance system that is custom-made for an individual cutting tool.

Another object of the invention is to provide a new and improved power cutting tool guidance system that incorporates a straightedge with an extension tab for initial alignment of the cutting tool.

Another object of the invention is to provide a new and improved power cutting tool guidance system that is biased to cooperate with the most reliable part of the base plate.

Another object of the invention is to provide a new and improved power cutting tool guidance system in which a cutting indicator is easily marked.

Another object of the invention is to provide a new and improved power cutting tool guidance system in which a cutting indicator is simply connected to, and easily removed from, a cutting board.

Another object of the invention is to provide a new and improved power cutting tool guidance system in which indicia means insures proper placement and orientation of a straight edge guide member.

Another object of the invention is to provide a new and improved power cutting tool guidance system wherein an indicator is self-aligning to avoid backwards assembly to a piece of stock.

Another object of the invention is to provide a new and improved power cutting tool guidance system that enables an operator to make his cut with either a left or right follower edge of the took base plate.

Another object of the invention is to provide a new and improved power cutting tool guidance system in which a straightedge is fastened to the workpiece with pegs that do not obstruct offset of the drive means of the tool.

Another object of the invention is to provide a new and improved power cutting tool guidance system wherein the pegs that fasten the straightedge to the work stock will not loose during cutting.

Another object of the invention is to provide a power cutting tool guidance system in which the straightedge does not need to be manually held in place.

Another object of the invention is to provide a new and improved power cutting tool guidance system with a straightedge having a perpendicular backplate to establish a right angle cut.

In accordance with the above objects, a customized elongated trapezoidal indicator is fastened to a cutting board and butt against a straightedge. The follower edge of the cutting tool base plate is butt against the straightedge and the cutting board is cut until the indicator is notched in one of its base edges. A second cut is made backwards on the other side of the board to notch the indicator so as to provide a corresponding pair of alignment notches. A second set of notches may be formed in the indicator by turning the tool 180° to permit the operator to cut the stock with eitherside of the cutting tool. The indicator is provided with a flange on one end to signal the correct side that it is to butt against the straightedge.

The straightedge utilized in forming the indicator includes a flanged backplate that overlies the cutting board. It establishes perpendicularity between the guiding edge of the straightedge and the cutting board. Nylon bushings are received in holes in the straightedge and peg pins are tightly held in the bushings. The holes are offset to avoid obstruction with the overhang of the power tool. An extension tab provides an extension of the straightedge for initial alignment of the cutting tool with respect to the cutting board. The flange is tapered to permit the cutting tool overhang to extend over it without contact. The indicator is removed from the cutting board by punching the fastening pins through molded holes that extend intermediate the major and minor bases of the indictor.

A deluxe, adjustable indicator is characterized by a split bracket slidable about a pair of parallel slide rails. The bottom part of the bracket is notched, and the bracket is movable along the slide rails to the position corresponding to the offset distance between the cutting blade and the base plate follower edge. A fastener is received in aligned openings in the top and bottom part of the split bracket to fasten that bracket at the particular desired station along the slide rails. A flange is connected to one end of the slide rails to indicate which edge is to be butt against the straightedge. The fasteners include centerholes through which peg pins are inserted and penetrate the cutting board or work stock.

Marks on the order of ¼ inch long are scribed on each side of stock that is to be cut. The indicator in placed on the work stock and the marks centered in the notches. Then the indicator is pegged to the work stock. The straightedge is then placed on the cutting stock and butt against the indicator making substantial endwise surface contact with the flange of the indicator. For relatively wide workpieces the straightedge is a ruler having holes offset from its ceter and nylon bushings received in the holes to tightly grasp peg pins. For rip cutting relatively narrow stock, the staightedge with the backplates may be used. Pegs are placed in the offset holes and the indicator is removed from the work stock. The pegs may include an area of magnetic material which prevents them from being jarried loose during cutting of the stock. The cutting tool is then brought in contact with the work stock, the base plate follower edge butting against the straightedge. The cutting tool is then pushed along the stock with the base plate sliding along the straightedge until the cut is completed. The straightedge provided with an extension may be used to insure proper prealignment of the blade with respect to the work stock.

The above and other objects will be apparent as the description continues and when read in conjunction with the appended drawings.

BRIEF DESCRIPTION OF THE DRAWINGS

FIG. 1 is a perspective view of the basic indicator before preparation.

FIG. 2 is a top plan view of the set up for notching the indicator.

FIG. 3 is an enlarged sectional view taken on line 3—3 of FIG. 2.

FIG. 4 is an enlarged side elevation view as taken from the right hand side of FIG. 2, but with the cutting tool reversed to show the clearance for the tool overhang.

FIG. 5 is a perspective view of the completed indicator.

FIG. 6 is an enlarged sectional view taken on line 6—6 of FIG. 5.

FIG. 7 is an enlarged sectional view taken on line 7—7 of FIG. 1.

FIG. 8 is a perspective view of a fastening pin for holding the straightedge.

FIG. 9 is a sectional view taken on line 9—9 of FIG. 8.

DETAILED DESCRIPTION OF THE DRAWINGS

Figure 10:
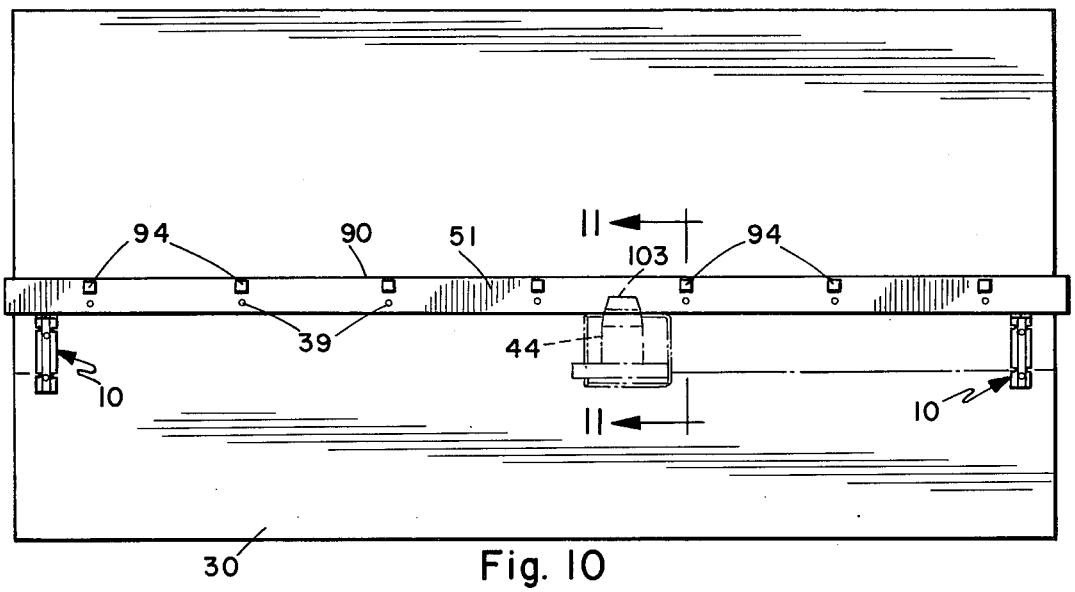
FIG. 10 is a top plan view of the indicators and straightedge set up for making a cut.
Figure 11:
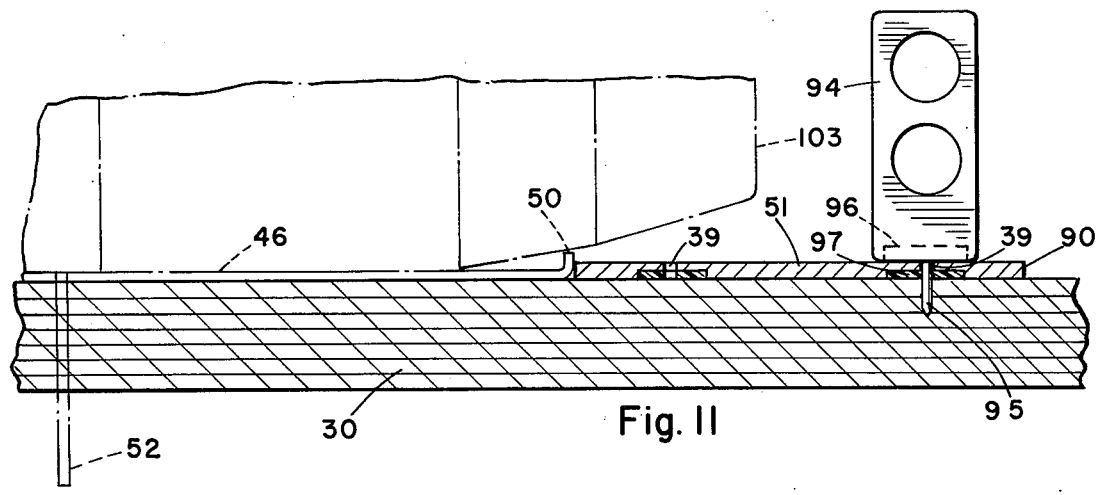
FIG. 11 is an enlarged view taken on line 11—11 of FIG. 10.
Figure 12:
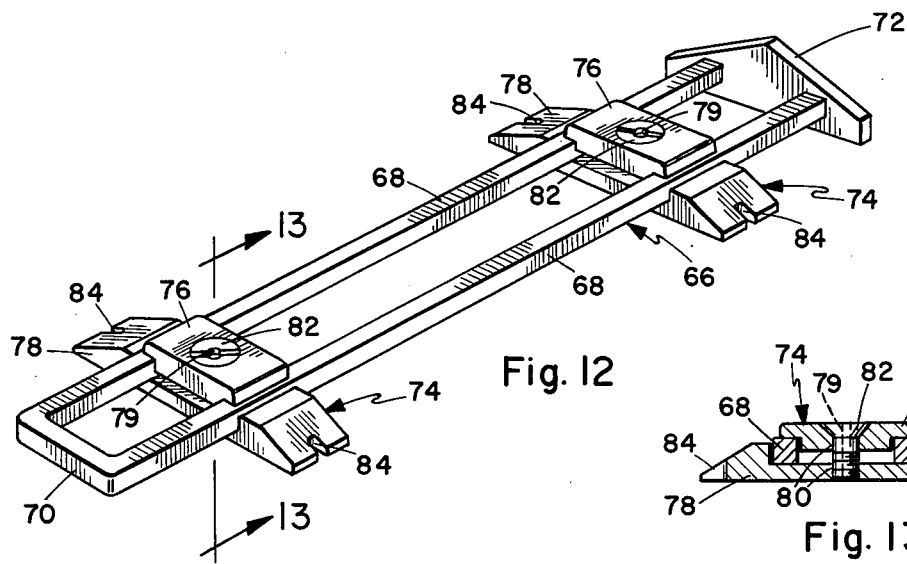
FIG. 12 is a perspective view of an alternative adjustable indicator.
Figure 13:
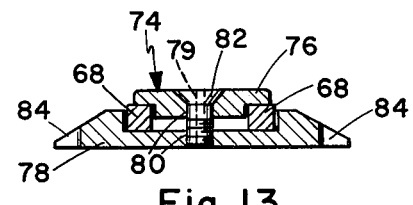
FIG. 13 is a sectional view taken on line 13—13 of FIG. 12.

A customized indicator 10 is illustrated as having an elongated body of trapezoidal cross section defined by the sloping walls 12 and 14. The major base 16 and the sloping wall 14 define the edge 20. A pair of openings 22 are adjacent the terminal edges of the indicator 10, and molded webs 24 are disposed within the openings 22. The webs 24 include central bores 26 through which the indicator 10 is nailed to the cutting board 34. A triangular flange 28 is connected to one of the terminal edges of the indicator 10. The flange 28 is orthogonal to the longitudinal axis of the indicator 10, and it serves to properly align the indicator when the cutting of the work stock 30 is to be performed. The indicator also includes tack down holes 32 which fasten the indicator 10 to the work stock 30.

The indicator 10 is fabricated by assembling it to a cutting board 34 that may be on the order of 6 inches wide. A straightedge 36 is pegged to the cutting board 34 by means of the pegs 94. The peg pins 95 are received through nylon bushings 97 in holes 38 in straightedge 36. The bushings 97 grasp the peg pins 95 tightly to prevent them from shaking loose during cutting of the board 34. Furthermore, the pegs 94 are provided with an area of magnetic material 96. The attraction between the metallic straightedge 36 and the pegs 94 is further assurance against shaking loose during cutting.

The straightedge 36 includes the integral backplate 31 and it overlies the cutting board 34. Whereas most carpenter's squares have a substantial backplate that causes the square to pivot off the work stock, the straightedge 36 has no tendency to tip. The straightedge 36 includes the flange 102 that is butt against side 54 of the cutting board 34 to establish perpendicularity. The flange 102 extends on both sides of backplate 31 so that the straightedge 36 may be flipped over for cutting initiated from side 58.

The straightedge 36 includes a tab 100 that protrudes outwardly from flange 102. The tab 100 extends the guiding edge 40 beyond the cutting board 34 to provide proper initial guidance for a power saw 44.

The power saw 44 is of conventional construction having an overhang 103 of its drive motor. The saw 44 includes a base plate 46. The edges 48, 50 of the base plate 46 are upturned and extend parallel to the cutting blade 52. The edges 48, 50 function as follower edges so that the saw 44 may be guided through its cut. In forming the indicator 10, the saw 44 is placed against the edge 54 of the cutting board 34. The follower edge 48 is flush against the guiding edge 40 and the saw 44 cuts through the cutting board 34 until it forms a relatively small notch 56 in the edge 18 of the indicator 10. The saw 44 is then removed and placed adjacent the edge 58 of cutting board 34 and is urged backwards, with the follower edge 48 flush against the edge 40. The cutting board 34 is cut in this backwards direction until the notch 60 is formed in the edge 20 of the indicator 10. The saw 44 is then removed and rotated 180° and the cutting blade 52 is brought in contact with the edge 58 of the cutting board 34 with the follower edge 50 flush with the guiding edge 40. The ends of flange 102 are tapered, as at 101, to provide clearance for the saw overhang 103, as indicated in broken line in FIG. 4. The cutting board 34 is then cut in the forward direction until the notch 62 is formed. The saw 44 is then removed and placed adjacent the edge 54 and the cutting board 34 is cut in the backwards direction until the notch 64 is formed.

It is important to note that the thickness of the straightedge 36 used should be in the range of 0.080 to 0.160 inches. In the manufacture of power tools, little attention is given to the accuracy of the bends in the base plates 46. Consequently, there may be substantial variance between different units of the same model saw. It has been found that a straightedge thickness between 0.080 and 0.160 inches insures contiguity at the most accurate part of the bend in the base plate 46.

The indicator 10 is now complete and ready for use in cutting work stock 30. Its removal is effected by striking a center punch on top of the nailed webs 24 to break them and the indicator 10 is released from the cutting board 34. This simple removal is of substantial convenience on a field job and permits a rapid transfer of the indicator 10 from the cutting board 34 to the work stock 30. The indicator 10 thus formed is custom-made to suit an individual saw 44. If a change in the cutting tool is made, a new indicator should be fabricated since there may be slight differences in the dimensions of the base plates 46 of individual saws 44. These differences may be present even in various units of the same make and model number.

While the indicator 10 is usable only for an individual saw 44, an adjustable indicator 66 accommodates saws 44 of various dimensions and characteristics. The adjustable indicator 66 has a pair of parallel slide rails 68 joined at the frontal end by a unitary corner 70. The distal end has a flange 72 which functions identically as the flange 28 of the previous embodiment. The indicator 66 includes a pair of split brackets 74. The split brackets 74, as illustrated in cross-section, comprise top and bottom sections 76, 78 and and aligned openings 80 are formed in the sections 76, 78. A removable fastener 82 threadably engages in the bottom section 78. A tack hole 79 is formed in the fastener 82 to accommodate a peg pin 95 when indicator 66 is pegged to the work stock 30. The bottom section 78 includes a pair of notches 84 which function identically as the notches defined in the previous embodiment. The notches 84 are oriented in the bottom section 78 such that a plane passing centrally through those notches will be orthogonal to the plane of the slide rails 68. In adjusting the indicator 66 to the individual cutting too, the follower edges 48, 50 of the saw 44 are placed co-planar with the flange 72 against straightedge 36 or ruler 51, and the bracket 74 is moved along the slide rails 68 until a notch 84 centers the cutting blade 52. The fastener 82 is then tightened until the bracket 74 is secure in the particular position. A second bracket 74 may be adjusted along the slide rails 68 to correspond to the offset between the cutting blade 52 and the other follower edge.

Bushing reinforced holes 39 are formed along at approximately 6 inches intervals along the length of the ruler 51 and are placed ½ inch from the edge 90 thereof. Nylon bushings 97 of the type previously described are received in the holes 39 to tightly hold the peg pins 95. The peg pins 95 are inserted through the bushings 97 and into the workstock 30. The ruler 51 is used as the guide member when it is desired to cut work stock of substantial width. When it is desired to rip cut a relatively narrow workstock the straightedge 36 may be used. In most saws 44, the drive means overhangs 103 beyond the follower edge 50 of the base plate 46. The pegs 94 are positioned adjacent the edge 90 of the ruler 51 to prevent obstruction with the overhang 103 as the saw 44 is drawn across the workpiece 30. Furthermore, the pegs 94 are of substantial size to permit easy grasp by the craftsman.

In using the system, the operator scribes mark approximately ¼ inch long adjacent each edge of the work stock 30. An indicator 10 or 66 is placed on the work stock 30. An indicator 10 or 66 is placed on the work stock 30 and the marks are centered within the notches 56, 60 or 62, 64. Pegs 94 are inserted in the tack down holes 32 or 79 in the indicator 10 or 66 and the straightedge 36 or ruler 51 is butt against the flanges 28 or 72 to make substantial endwise surface contact therewith. Pegs 94 are inserted in the bushings 97 to maintain position with respect to the work stock 30. The pegs 94 are withdrawn from the indicator 10 or 66 and that indicator is removed so that the work stock 30 can be cut. The saw 44 is then placed adjacent the work stock 30 with the desired follower edge 48, 50 butting against the straightedge 36 or ruler 51. The saw 44 is drawn through the work stock 30, and the appropriate follower edge maintains contact with the guiding edge 40 at all times.

The apparatus previously disclosed enables the cutting of an 8 feet work stock within 30 seconds. The marks which are generally 1.32 of an inch in thickness can be sliced in half. The method and apparatus disclosed herein is particularly useful on a field job and is simpler to utilize than an electric table saw.

Having described my invention, I now claim:

1. A straight edge for use in guiding a power tool for cutting a straight line on work stock, having a top surface, a side edge and a work stock corner formed by the intersection between the top surface and the side edge, such straight edge comprising:

a planar cross member adapted to overlie said work stock parallel to the direction of cutting said work stock, said cross member comprising a guiding edge for said power tool, a planar back plate member connected to said straight edge to be coplanar with said cross member and extending orthogonal to the direction of cutting said work stock in overlying relation with regard to said work stock, said cross back plate having an outer terminal edge and an inner terminal edge spaced apart from said outer terminal edge and located in the plane containing said plate and cross members, flange means formed on said outer terminal edge and projecting beyond both sides of the plane containing said back plate and cross members to abut the work stock side edge to position said back plate member on the work stock top surface with said inner edge located above and in contact with the top surface so that said back plate is supported on top of the work stock top surface whereby the straight edge is supported in guiding orientation on the work stock by the work stock top surface, said flange means being tapered toward said guiding edge to avoid obstruction with an overhang of the power tool.

2. The straightedge of claim 1 including:
a tab member connected to said straightedge and adapted for extending said guiding edge outwardly from said work stock for properly aligning said power tool with respect to said work stock.

3. The straightedge of claim 1, including:
bushing reinforced holes adapted for receiving and tightly holding fastening pins;
and said holes disposed adjacent the edge distal from said guiding edge to avoid obstruction with an overhang of said power tool.

4. Apparatus for use in establishing the offset required between a straight edge and a cutting blade of a power tool which comprises:
an indicator member,
one end face of said indicator member finished perpendicular to the body of said indicator member and adapted to make substantial end wise surface contact with said straight edge,
said indicator member including indicia means at a distance from siad end face equal to the offset between said straight edge and said cutting blade,
a trapezoidal elongated bar,
said indicia means comprises a notch in an edge defining a major base of said trapezoidal bar.

5. The apparatus of claim 4, said indicator member comprising:
said trapezoidal elongated bar having sloped sides defining acute angles with respect to a major base of said trapzoidal bar,
said indicia means comprising notches in the edes between said sides and said major base.

6. The apparatus of claim 4, said indicator member comprising:
identifying means associated with one end face for establishing proper orientation of said indicator member with respect ot said straightedge.

7. The apparatus of claim 5, said indicator member further comprising:
a minor base defined by said sloped sides;
an opening extending from said minor to said major base;
a web in said opening defining a bore;
and nails received in said bore adapted to be driven through said bores by breaking said webs.

8. The apparatus of claim 4, wherein:
said indicator is fabricated from plastic material.

9. The apparatus of claim 4, said straightedge including:
at least one guiding edge, and
at least two bushing reinforced holes formed therein adjacent the other edge thereof.

10. The apparatus of claim 9, wherein:
said bushing reinforced holes are formed in said straightedge sufficiently close to said edge thereof to avoid obstruction with an overhang of a power drive means of said cutting tool.

11. Apparatus for use in establishing the offset required between a straight edge and a cutting blade of a power tool which comprises:
an indicator member,
one end face of said indicator member finished perpendicular to the body of said indicator member and adapted to make substantial end wise surface contact with said straight edge,
said indicator member including indicia means at a distance from said end face equal to the offset between said straight edge and said cutting blade,
a pair of generally parallel rails,
a first bracket adjustable along said rail to positions corresponding to the offset between said straight edge and individual power tools cutting blades.

12. The apparatus of claim 11, said indicia means comprising:
a notch formed in an edge of said bracket.

13. The apparatus of claim 12, wherein said indicator includes:
a second bracket adjustable along said rails, and said first and second brackets are notched on opposite edges thereof.

14. The apparatus of claim 11, wherein said first bracket comprises:
upper and lower parts, aligned openings in said upper and lower parts, and
a fastener releasably fastening said upper and lower bracket parts to said rails at a position corresponding to the offset between the straightedge and a power tool cutting blade.

15. The apparatus of claim 14, wherein:
said straightedge is formed from a metallic material of a thickness between 0.080 and 0.160 inches, and
pegs received in said bushing reinforced holes and having magnetic area to prevent them from jarring loose during the cutting of work stock.

* * * * *